United States Patent
Maeda et al.

(10) Patent No.: US 7,416,794 B2
(45) Date of Patent: Aug. 26, 2008

(54) MAGNETIC RECORDING MEDIUM, METHOD FOR MANUFACTURING RECORDING MEDIUM AND MAGNETIC RECORDING APPARATUS

(75) Inventors: Tomoyuki Maeda, Kawasaki (JP); Akira Kikitsu, Yokohama (JP); Soichi Oikawa, Kawasaki (JP); Takeshi Iwasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 497 days.

(21) Appl. No.: 11/080,487

(22) Filed: Mar. 16, 2005

(65) Prior Publication Data

US 2005/0214591 A1 Sep. 29, 2005

(30) Foreign Application Priority Data

Mar. 25, 2004 (JP) ............................. 2004-090669

(51) Int. Cl.
G11B 5/66 (2006.01)
(52) U.S. Cl. ........................................ 428/832; 360/131
(58) Field of Classification Search ........................ None
See application file for complete search history.

(56) References Cited

U.S. PATENT DOCUMENTS

| 4,575,475 A | 3/1986 | Nakayama et al. |
| 2005/0142388 A1* | 6/2005 | Hirayama et al. ..... 428/694 TM |

FOREIGN PATENT DOCUMENTS

| JP | 02-110842 | 4/1990 |
| JP | 3-235218 | 10/1991 |
| JP | 6-259764 | 9/1994 |
| JP | 10-92637 | 4/1998 |
| JP | 11-154321 | 6/1999 |
| JP | 2001-56922 | 2/2001 |
| JP | 2003-338029 | 11/2003 |

OTHER PUBLICATIONS

Hideaki Ono et al., "Magnetic Properties of Fe/Fe-N and Fe/Cu-N Multilayered Films Having Intermediate Layers Containing Nitrogen," IEEE Transactions on Magnetics, vol. 31 (No. 1), p. 795-799, (Jan. 1995).
Chinese Patent Office, "Notification of the First Office Action," 3 pp, (Aug. 4, 2006).
Ohno, S., et al., "Growth Mechanism of Fe Nanoisland Array on Cu(001-c(2x2)N Surfaces", Surface Science 523 (Oct. 7, 2002), pp. 189-198.
Rousset, S., et al., "Self-Ordering on Crystal Surfaces: Fundamentals and Applications", Material Science and Engineering B96 (2002), pp. 169-177.
Cohen, C., et al., "Surface Relaxation and Near-Surface Atomic Displacements in the N/Cu(100) Self-Ordered System," Surface Science 490, (Jun. 8, 2001), pp. 336-350.
Nishimaki, J., et al., "Three-Dimentional Atom Probe Analysis of Co-Cr-Ta Thin Film," Appl. Phys. Lett. 69 (20) (Nov. 11, 1996), pp. 3095-3097.

* cited by examiner

*Primary Examiner*—Holly Rickman
(74) *Attorney, Agent, or Firm*—Pillsbury Winthrop Shaw Pittman LLP (57) ABSTRACT

A magnetic recording layer is formed on an under-layer comprising a Cu crystalline grain layer and a deposited nitrogen atom layer on the Cu crystalline grain layer surface. Then the magnetic recording layer comprising very small average grain diameter and sharp grain diameter distribution is obtained. The magnetic recording medium comprising the magnetic recording layer shows excellent signal to noise ratio at high density recording.

12 Claims, 11 Drawing Sheets

AVERAGE NUMBER OF MAGNETIC
CRYSTALLINE GRAINS  n  [ GRAINS/cm$^2$ ]

MAGNETIC RECORDING MEDIUM, METHOD FOR MANUFACTURING RECORDING MEDIUM AND MAGNETIC RECORDING APPARATUS

CROSS-REFERENCE TO RELATED APPLICATIONS

This application is based upon and claims the benefit of priority from the prior Japanese Patent Application No. 2004-090669, filed on Mar. 25, 2004; the entire contents of which are incorporated herein by reference.

BACKGROUND OF THE INVENTION

1. Field of the Invention

The present invention relates to magnetic recording media, methods for manufacturing recording media and magnetic recording apparatus, in particular, to magnetic recording media having high recording density, methods for manufacturing the recording media and magnetic recording apparatus such as hard disk drives in which the high-density recording media are equipped.

2. Description of the Related Art

Hard disk drives (HDDs) have been expanding their application scope from the first computer related application to various other applications, such as home video recorder and car carrying navigation system applications as magnetic recording systems for recording and reproducing information. The expansion is due to their advantage such as high data access speed and high data storage reliability in addition to their high recording capacity performance with low cost. Requirements for HDDs having larger recording capacity have been increased with the expansion of the HDD application scope. Replying to the requirements, large capacity recording technology has been advanced by increasing recording density of the magnetic recording media.

With increasing recording density of the magnetic recording media of HDDs, the recording bit sizes and the diameters for the magnetization reversal units became very small. As the result, thermally decreasing phenomena of recorded signal magnetization and the recording and reproducing performance by thermal fluctuation effect caused by the very small magnetization reversal units became notable. Furthermore, noise signals which appear at boundary regions between recording bits became large as a result of decreasing recording bit to a very small size, and the noise became to give a large influences upon the signal to noise ratio. Therefore, in order to attain further high recording density, it is required to stabilize thermal stability of the recorded signal magnetization at one hand and to attain low noise characteristics at high recording density at the other hand.

To decrease magnetic recording medium noise, size of magnetic crystalline grains constructing recording-layer have been made smaller up to now. For example, magnetic crystalline grains of Co—Cr magnetic-layer of widely used magnetic recording media were made small by adding small amount of Ta or B (refer to Japanese Patent Laid-open Applications Nos. HEI 11-154321 and 2003-338029), and by precipitating nonmagnetic Cr by heat treating at appropriate temperature (refer to Japanese Patent Laid-open Applications Nos. HEI 3-235218, and HEI 6-259764). Recently, a method for obtaining magnetic recording layer having so called granular structure obtained by adding oxides such as $SiO_x$ to the magnetic layer was applied. In the granular structured magnetic layer, nonmagnetic grain boundary material enclose magnetic crystalline grains (refer to Japanese Patent Laid-open Applications Nos. HEI 10-92637, and 2001-56922).

These methods, however, cannot control the crystalline grains of the magnetic-layer and the under-layer by going back to the nucleation processes for the crystalline grains of the under-layer and the magnetic recording layer. These methods control an average magnetic crystalline grain diameter and grain boundary regions merely by choosing combination of raw materials, the raw material composition, or by choosing of depositing conditions. When the crystalline grain diameters in the under-layer are tried to make smaller, the crystalline quality and crystal orientation degree of the grains in the under-layer are degraded, and the degraded crystalline quality of the under-layer grains gives influence upon the formation of magnetic crystalline grains.

Actually it was found that the magnetic-layer prepared using this procedure showed distributions of broad grain size and grain boundary width. Magnetic recording media decreasing the average grain size of the magnetic crystalline grains to 5 nm showed poor thermal fluctuation durability. Very small grain diameter components unstable to thermal fluctuation were included at large fraction. Then it was difficult to attain further high recording density using this method.

SUMMARY

In order to attain high recording density of a magnetic recording medium, it is required to obtain recorded magnetization stability to thermal fluctuation and to attain low noise at high recording density. Then for obtaining higher recording density, it is required to solve two problems. One of the problems to be solved is to attain low noise by decreasing average diameter of the magnetic crystalline grains in the magnetic-layer. The other problem to be solved is to attain thermal stability by obtaining small crystalline grain size distribution of the magnetic crystalline grains not including too small grains easily influenced by thermal fluctuation.

As a result of long exploring work for obtaining a solution to the problems, the inventors of the present invention have got a remarkable finding. The finding is that the size of magnetic crystalline grains of the magnetic-layer can be made small with very sharp grain size distribution when the under-layer is a Cu metal film accompanied with thin deposited layer of nitrogen atoms. After carrying out a further investigation, the inventors could solve the problems described above and completed the present invention.

The magnetic recording medium of the present invention comprises substrate, an under-layer formed on the substrate, a magnetic recording-layer on the under-layer, and a protective-layer formed on the magnetic recording-layer. The under-layer comprises a grain diameter control under-layer comprising Cu crystalline grains and a deposited layer of nitrogen atoms formed on the grain diameter control under-layer.

The method for producing magnetic recording medium of the present invention comprises a process for forming a grain diameter control under-layer comprising Cu crystalline grains on a substrate, a process for forming a deposited layer of nitrogen atoms depositing nitrogen on the grain diameter control under-layer surface, and a process for forming a magnetic recording-layer on the substrate having the nitrogen-layer deposited on a grain diameter control under-layer.

Furthermore, the magnetic recording and reproducing apparatus of the present invention comprises the magnetic recording medium described above, a recording medium driving mechanism, driving the magnetic recording medium, a recording and reproducing head mechanism, recording information to the magnetic recording medium and reproducing from the magnetic recording medium, a head driving mechanism, driving the recording and reproducing head and a recording and reproducing signal processing system, processing recording signals and reproducing signals.

In the present invention, grain size of the under-layer crystalline Cu need not be small. So the problem of prior art methods encountered for obtaining small magnetic grains using small grain size under-layers can be avoided, and as the result, recording media having increased recording and reproducing characteristics can be obtained according to the present invention. The Grain diameter control under-layer comprising Cu crystalline grains of the present invention can contain other elements in a range in which the advantage of the present invention is effective.

The detailed mechanism of obtaining small grain sizes by using nitrogen deposited Cu metal film under-layer is not clear at present. Here, two papers will be introduced and will give a concise comparison between the present invention and the papers.

In one of the papers appeared in Surface Science Vol.523 pp 189-198 (2003) an alternately arranged surface structure composed of regions having nitrogen absorption and regions having no absorption is reported. The nitrogen atoms were absorbed on bulk single crystal Cu surface after cleaning up treatment in an ultra vacuum of $10^{-9}$ Pa.

In the other paper appeared in Material Science and Engineering Vol.B96 pp. 169-177 (2002), an explanation for the ordered arrangement of the nitrogen atoms on the single crystal Cu surface is given. The ordered arrangement is explained as a self organizing structure due to an stress interaction appeared on a clean surface of a bulk Cu single crystal.

Comparing the two papers with the present invention, it can be pointed out that the grain diameter control under-layer comprising Cu crystalline grains in the present invention is not a bulk single crystal but a thin film. Therefore, the state having stress in the thin film of the present invention is quite different from the surfaces of bulk Cu single crystals of these papers. Therefore, the re-oriented ordered surface structure shown in these papers cannot always be expected for the film of the present invention. At present, the mechanism of the present invention for obtaining small grain size is not clear. To find out the mechanism of the present invention is an important problem to be solved. According to the present invention, magnetic crystalline grains of a magnetic-layer can be made small and magnetic recording media for high density recording with increased signal to noise ratio can be obtained.

DETAILED DESCRIPTION

Hereinafter, embodiments of the present invention will be described in detail with reference to the drawings.

Figure 1:
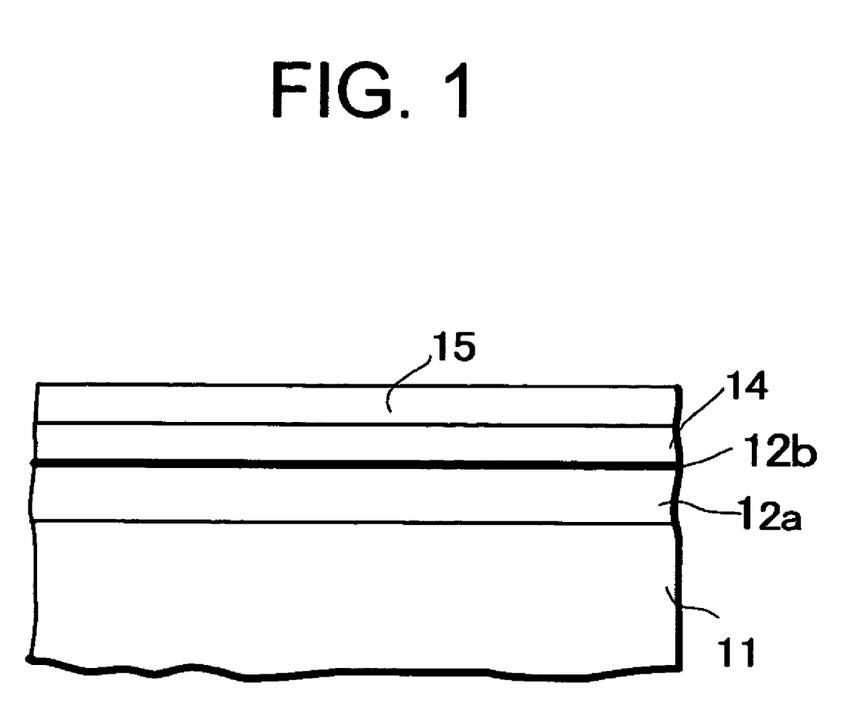
FIG. 1 is a schematically shown cross section view of a magnetic recording medium according to an embodiment of the present invention.

FIG. 1 is a schematically shown cross section view of a magnetic recording medium according to an embodiment of the present invention. A grain diameter controlling Cu thin film under-layer 12a is disposed on a substrate 11 in FIG. 1. A deposited layer of nitrogen atoms 12b is formed on the diameter control under-layer 12a. A magnetic recording-layer 14 is formed on the deposited layer of nitrogen atoms 12b, and a protective and lubricant layer 15 is formed on the magnetic recording-layer 14.

Quantity of the deposited nitrogen atoms per unit area desirable for the deposited layer of nitrogen atoms 12b on the surface of the grain diameter control under-layer 12a is in a range from $1 \times 10^{13}$ atoms/cm$^2$ to $1 \times 10^{15}$ atoms/cm$^2$, being expressed by the average number of atoms per unit area. When the quantity is less than $1 \times 10^{13}$ atoms/cm$^2$, significant average grain diameter decreasing effect cannot be obtained at the magnetic recording-layer. Furthermore, experimental result shows that magnetic crystalline grain orientation of the magnetic recording-layer decreases when the quantity is larger than $1 \times 10^{15}$ atoms/cm$^2$. The quantity of the deposited nitrogen atoms is more desirable to be in a range from $5 \times 10^{13}$ atoms/cm$^2$ to $5 \times 10^{14}$ atoms/cm$^2$.

Number of nitrogen atoms at the deposited layer of nitrogen atoms 12b can be evaluated by a secondly ion mass spectroscopy (SIMS) method. Other methods, nuclear reactor analysis (NRA) using H$^+$ or $^{12}$C, Rutherford back scattering, X-ray photoelectron spectroscopy (XPS), and Auger electron spectroscopy (AES), for example, can be used for evaluating the number of nitrogen atoms. Furthermore, atom probe method described in Applied Physics Letters Vol.69 pp.3095-3097 can be used for the evaluation.

As a means for depositing nitrogen atoms on the surface of grain diameter control under-layer 12a, a method of exposing grain diameter control under-layer 12a after deposition to nitrogen ions or nitrogen radicals can be used. Other methods of irradiating nitrogen ions to the grain diameter control under-layer 12a or sputtering the Cu surface in nitrogen atmosphere can also be used. Furthermore, a method of exposing the surface to $NH_4$ atmosphere and then removing H can be used.

The desirable Cu crystalline grains for the grain diameter control under-layer 12a are grains having broader flat surface for obtaining the magnetic recording layer 14 with better crystallinity. Accordingly, larger average grain diameter of the Cu grains is desirable. The desirable average grain diameter of the Cu grains is 50 nm or larger, and more desirable diameter is 100 nm or larger. A single crystal film having no grain boundary is much more desirable. When the Cu film is not even in a certain degree, the film can be available provided that the film has large fraction of terrace surfaces that form the film surface.

The grain diameter control under-layer 12a in which the same crystallographic plane of each Cu grain is oriented parallel to the same plane is desirable because higher magnetic crystalline grain orientation can be obtained in the magnetic recording-layer 14. The grain diameter control under-layer in which (100) plane of each Cu grain is oriented parallel to the substrate surface are especially desirable for obtaining significantly small magnetic crystalline grains in the magnetic recording-layer 14.

Figure 2:
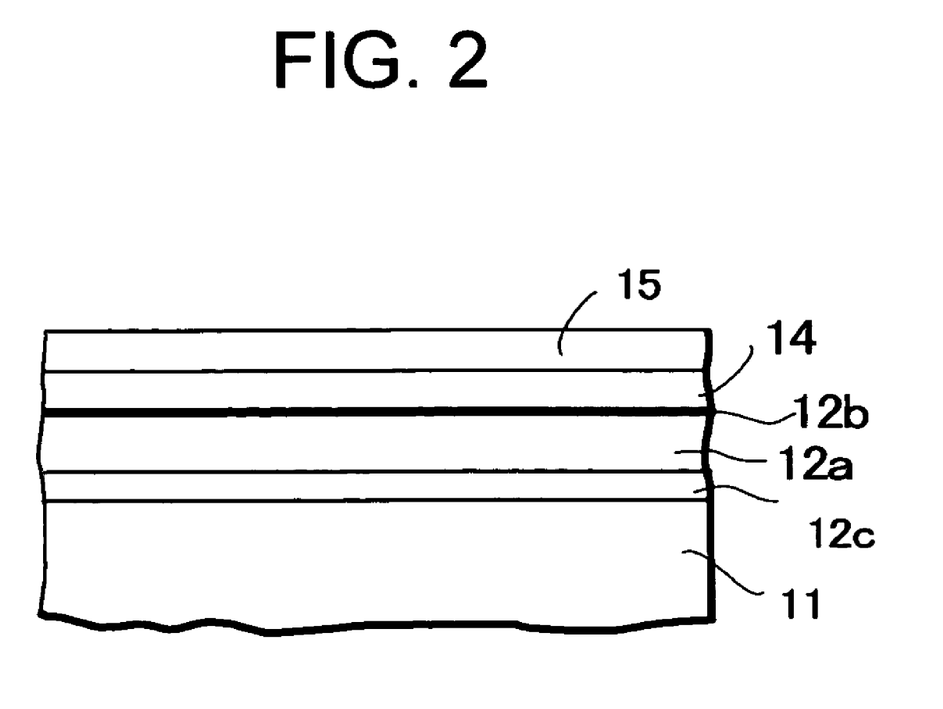
FIG. 2 is a schematically shown cross section view of a magnetic recording medium comprising an orientation control under-layer controlling orientation of Cu crystalline grains between a substrate and a grain diameter control under-layer according to an embodiment of the present invention.

As shown in FIG. 2, an orientation control under-layer 12c for increasing (100) plane orientation of Cu grains in the grain diameter control under-layer 12a can be placed between the substrate 11 and grain diameter control under-layer 12a. As the orientation control under-layer 12c, at least one material selected from the group consisting essentially of NiAl, MnAl, MgO, NiO, TiN, Si, and Ge can be used. The orientation control under-layer 12c need not be disposed directly adjacent to the grain diameter control under-layer 12a and can be disposed through an intervening layer.

The magnetic crystalline grains in the magnetic recording layer 14 are formed in plural per one Cu grain of the grain diameter control layer 12a on average. The desirable average areal density of the magnetic crystalline grains in the magnetic recording-layer 14 is in a range from $1 \times 10^{12}$ grains/cm² to $8 \times 10^{12}$ grains/cm² for obtaining large reproduced output of the recorded signal. When the average areal density of the magnetic crystalline grains is less than $1 \times 10^{12}$ grains/cm², the SNR decreases. The SNR decreases also when the average areal density is above $8 \times 10^{12}$ grains/cm².

From experimental results by the present inventors, it has been found that noise level of recording and reproducing characteristics can be reduced substantially and is desirable when the magnetic crystalline grains are arranged essentially in an ordered structure of tetragonal lattice.

Figure 3:
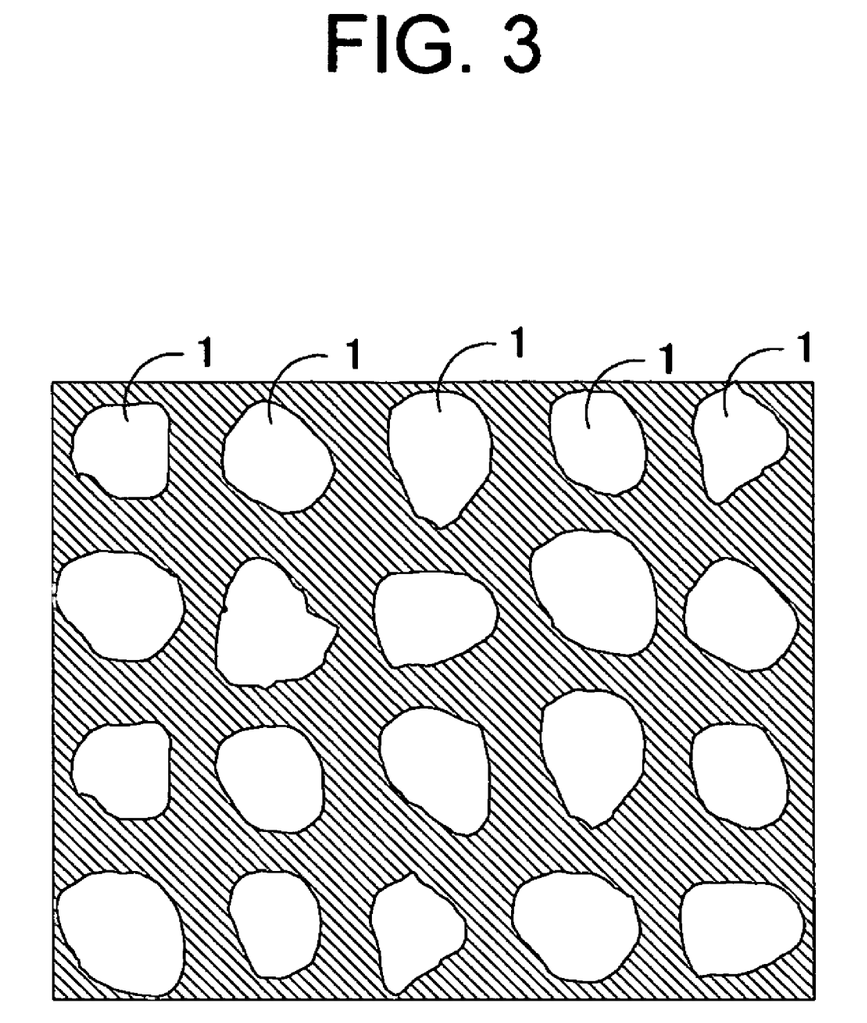
FIG. 3 is a schematically shown in-plane view of a magnetic recording-layer for a magnetic recording medium showing magnetic crystalline grains arranged in a form of a tetragonal lattice structure according to an embodiment of the present invention.

FIG. 3 schematically shows an in-plane structure of a magnetic recording medium according to an embodiment of the present invention. The white subjects express magnetic grains 1. Existence of tetragonal lattice structure arrangement of magnetic crystalline grains 1 can be evaluated by image processing and analyzing transmission electron microscope (TEM) Figurers for the film plane of the magnetic recording-layer 14.

Figure 4:
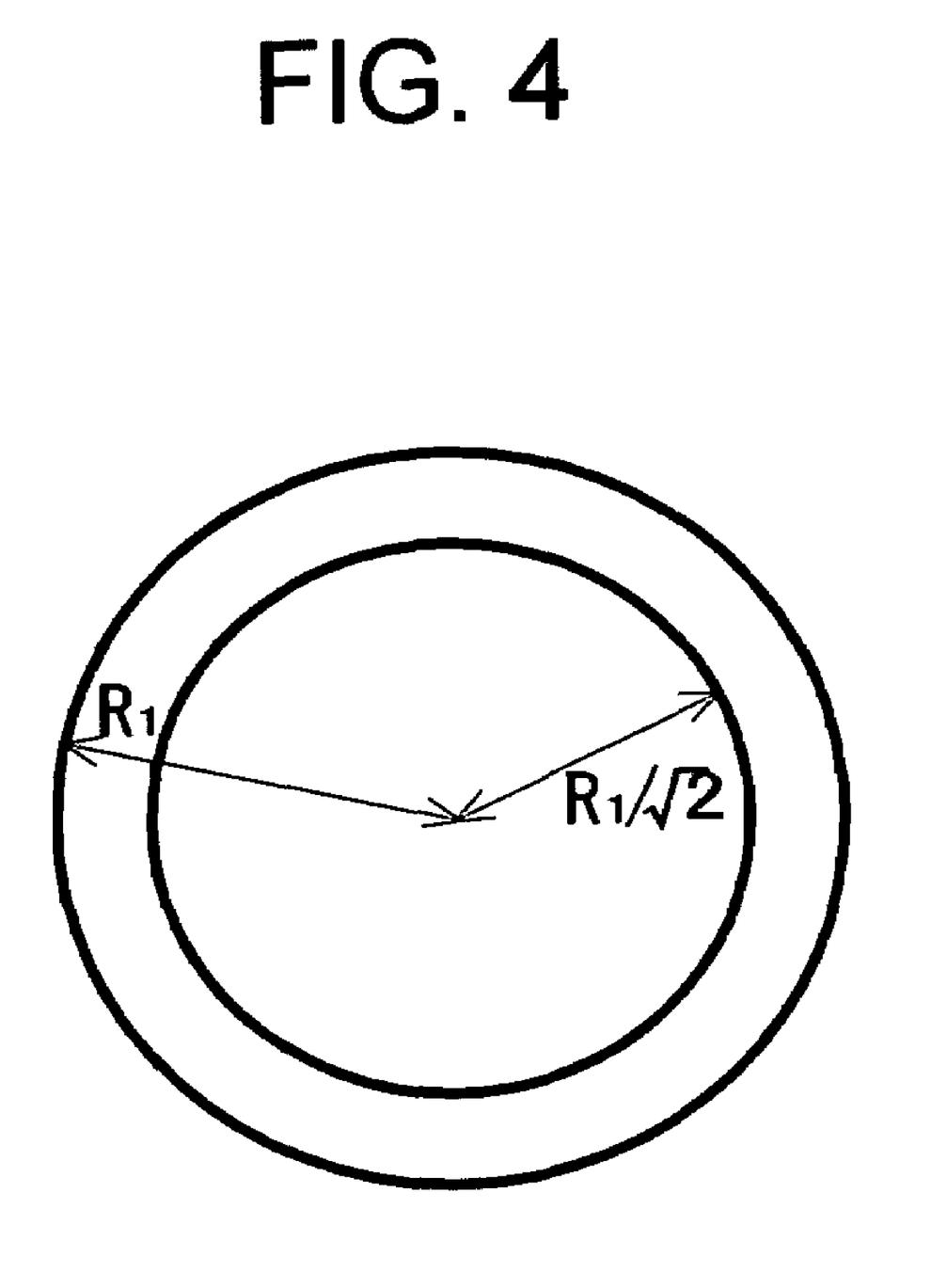
FIG. 4 is a schematically shown example of a ring pattern for the reciprocal lattice for the tetragonal lattice structure.

Using an image processing and analyzing software, a spectrum can be obtained as a result of a fast Fourier transformation of a binary Figure obtained by increasing contrast of a Figure for magnetic crystalline grains and grain boundary regions. The magnetic crystalline grains can be regarded to have an arrangement of tetragonal lattice structure essentially when patterns as shown in FIG. 4 can be recognized in the spectrum. Practically, two types of periodical spots or rings having a ratio of the distances to the center is $1:1/\sqrt{2}$ ($R_1$ and $R_1/\sqrt{2}$ in FIG. 4). Similar evaluation can be performed using low energy electron diffraction to the magnetic recording-layer and analyzing the diffraction patterns.

For the magnetic recording medium of the present invention, a magnetic recording-layer 14 having a granular structure is desirable. The granular structure with nonmagnetic grain boundary regions in the magnetic recording-layer 14 leads to a decrease in the exchange interaction between the magnetic crystalline grains and a significant decrease in the transition noise of recording and reproducing characteristics.

Disordered alloys such as Co—Cr and Co—Pt, ordered alloys such as Fe—Pt, Co—Pt and Fe—Pd, and multi-layered films such as Co/Pt and Co/Pd are desirable as materials for the magnetic recording-layer 14. These alloys and multi-layered films are desirable for their high crystalline anisotropy energy and therefore for their high thermal fluctuation durability. Magnetic properties of these alloys and multi-layers can be improved if necessary by adding some additive elements such as Cu, B, and Cr. CoCrPt, CoCrPtB, CoCrPtTa, CoCrPtNd, CoCrPtCu and FePtCu alloys can be further desirably used as materials for the magnetic recording-layer 14.

As the materials for forming grain boundary regions of the granular structure, compounds such as oxides and carbides are desirable, because these compounds do not form solid solution with the materials forming the magnetic crystalline grains described above and can easily be separated. Compounds such as $SiO_x$, $TiO_x$, $CrO_x$, $AlO_x$, $MgO_x$, $TaO_x$, $SiC_x$, $TiC_x$, and $TaC_x$ can be cited for forming the grain boundary regions.

The magnetic recording-layer 14 can be double structure or multi-layered structure. In this case at least one of the-layers has the construction described above.

Figure 5:
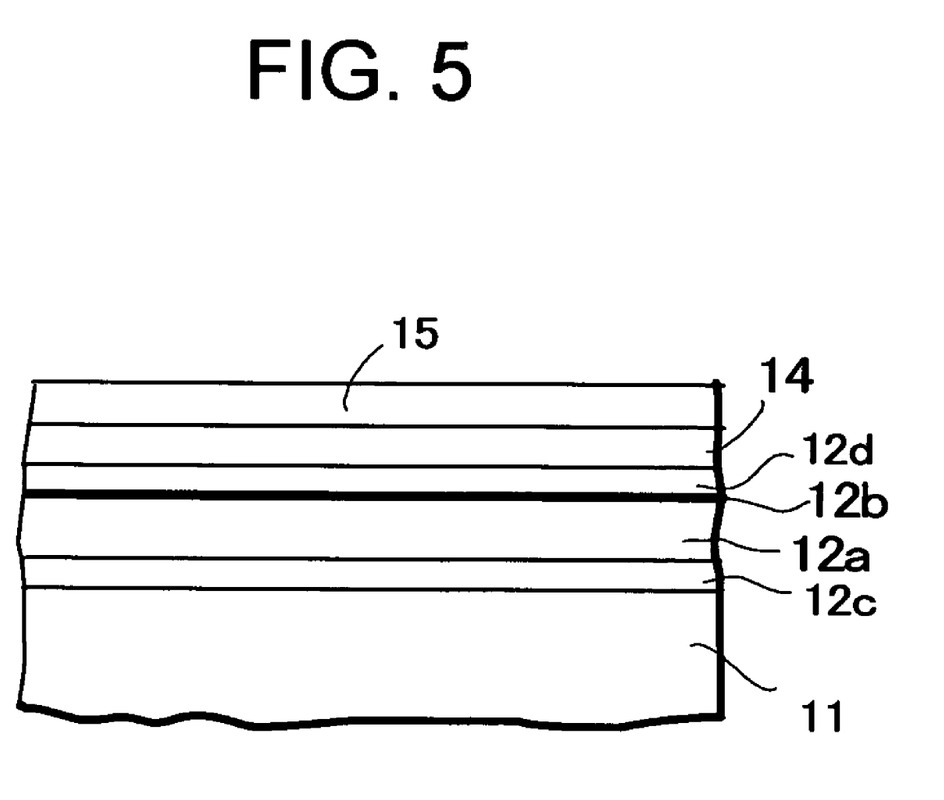
FIG. 5 is a schematically shown cross section view of a magnetic recording medium having an intermediate under-layer according to an embodiment of the present invention.

As shown in FIG. 5, an intermediate under-layer 12d for controlling characteristics of magnetic recording-layer 14 can be disposed in addition to the grain diameter control under-layer 12a accompanied with deposited nitrogen layer 12b and the orientation control under-layer 12c.

The crystal orientation degree can be improved by using a granular structured-layer as the intermediate under-layer 12d. The recording and reproducing characteristics can be increased by the improved crystal orientation degree in addition to the smaller average grain size and the smaller grain diameter distribution.

As the nonmagnetic crystalline materials of the intermediate under-layer 12d showing granular structure, Pt, Pd, Ir, Ag, Cu, Ru and Rh can be cited. These metal materials are desirable because these metal materials show good lattice compatibility with magnetic crystalline grains described above and can improve crystal orientation degree.

As the materials for forming grain boundary regions of the intermediate under-layer 12d, compounds such as oxides and carbides are desirable. These compounds are desirable as the materials for forming grain boundary regions because these compounds do not form solid solution with the nonmagnetic crystalline materials forming the magnetic crystalline grains described above and can easily be separated. Compounds such as $SiO_x$, $TiO_x$, $CrO_x$, $AlO_x$, $MgO_x$, $TaO_x$, $SiC_x$, $TiC_x$, and $TaC_x$ can be cited for forming the grain boundary regions. The materials constructing the under-layer can include magnetic metal when the under-layer is nonmagnetic as the whole.

The intermediate under-layer 12d with a granular structure can be constructed as multi-layer of two or more layers. The layer need not be placed adjacent to the magnetic recording-layer 14.

Figure 6:
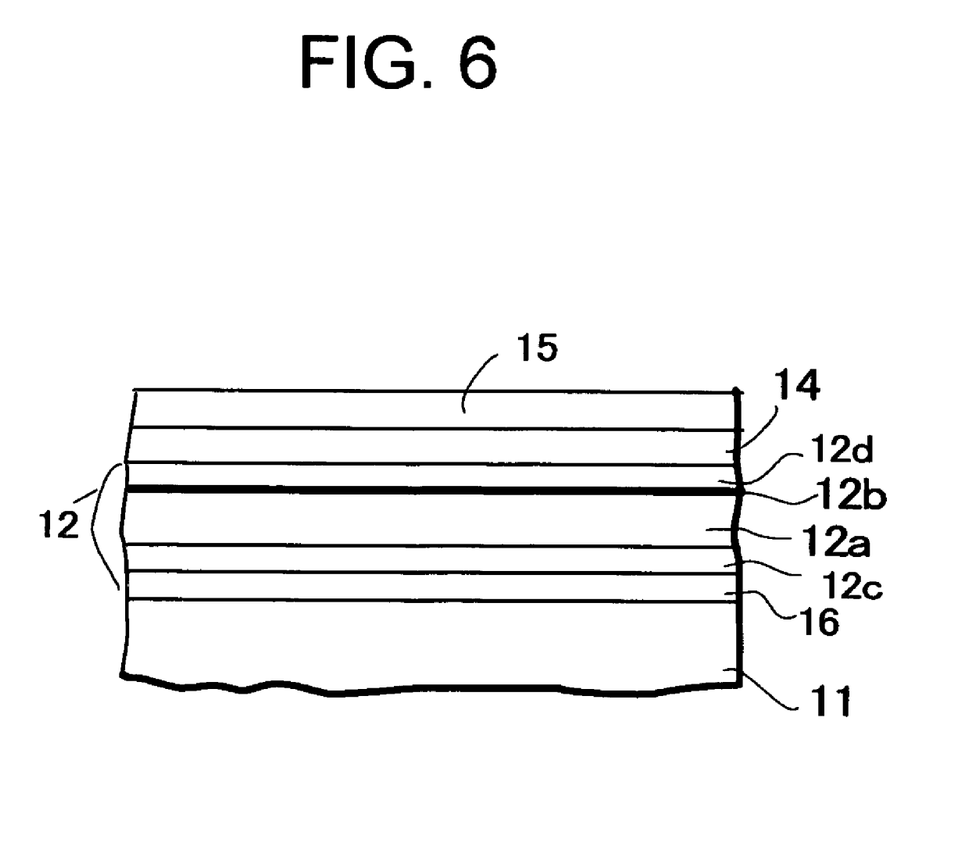
FIG. 6 is a schematically shown cross section view of a magnetic recording medium having a soft magnetic under-layer according to an embodiment of the present invention.

The magnetic recording medium of the present invention is applied as a perpendicular magnetic recording medium when a soft magnetic under-layer 16 is placed between the under-layers and the substrate 11 as shown in FIG. 6.

Disposing the soft magnetic under-layer 16 in the magnetic recording medium described above, so-called perpendicular double-layered medium, comprising the magnetic recording layer 14 disposed on the soft magnetic layer 16, can be constructed. The soft magnetic under-layer 16 shares a partial function of a magnetic head by returning magnetic flux induced by the recording magnetic field from a single pole head passing horizontally through the magnetic recording medium and turning back to the magnetic head. Therefore, the soft magnetic under-layer 16 placed in the magnetic recording medium plays a role for giving a sharp perpendicular magnetic field with sufficient magnitude to the magnetic recording layer 14.

As the soft magnetic under-layer 16, for example, CoZrNb, FeSiAl, FeTaC, CoTaC, NiFe, Fe, FeCoB, FeCoN and FeTaN, can be cited.

Figure 7:
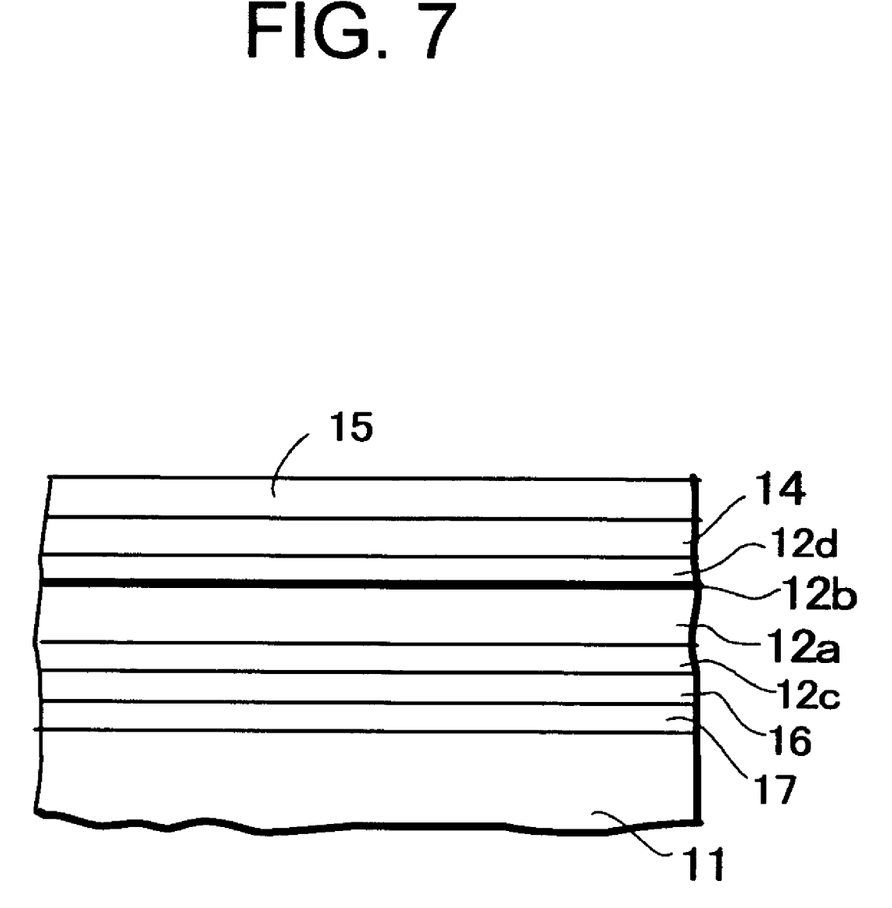
FIG. 7 is a cross section view of a magnetic recording medium having a biasing layer for a soft magnetic under-layer according to an embodiment of the present invention.

As shown in FIG. 7, a biasing-layer 17 consisted essentially of hard in-plane magnet-layer and antiferromagnetic material-layer, for example, can be disposed between the soft magnetic under-layer 16 and the substrate 11. Magnetic domains are easily formed in the soft magnetic under-layer 16, and magnetic domain walls induce spike like noise. The formation of magnetic domains can be avoided by applying a magnetic field in one radial direction of the biasing-layer 17 and applying biasing field to the soft magnetic under-layer 16 placed on the biasing-layer 17. The biasing-layer can be a multi-layered structure with finely dispersed anisotropy field to avoid formation of large magnetic domains.

As the material for constructing the biasing-layer 17, CoCrPt, CoCrPtB, CoCrPtTa, CoCrPtTaNd, CoSm, CoPt, FePt, CoPtO, CoPtCrO, CoPt—$SiO_2$, CoCrPt—$SiO_2$, and CoCrPtO—$SiO_2$ can be cited.

As shown in FIG. 6 and FIG. 7, the orientation control layer 12c described above can be disposed to improve (100) plane crystal orientation degree of Cu crystalline grains of grain diameter control under-layer 12a.

Glass substrates, Al alloys substrates or Si single crystal substrates with oxide surfaces, ceramic substrates, and plastic substrates can be used for the substrate 11. Furthermore, inorganic substrates plated with NiP, for example can be used.

Protective-layer 15 can be formed on the magnetic recording-layer 14. As the protective-layer 15, carbon or diamond like carbon can be used. Other materials $SiN_x$, $SiO_x$, and $CN_x$ can be cited as the protective-layer material.

As the method for depositing each-layer described above, vacuum evaporation method, every kind of sputtering method, molecular beam epitaxy method, ion beam evaporation method, laser abrasion method and chemical vapor deposition method can be used.

Figure 8:
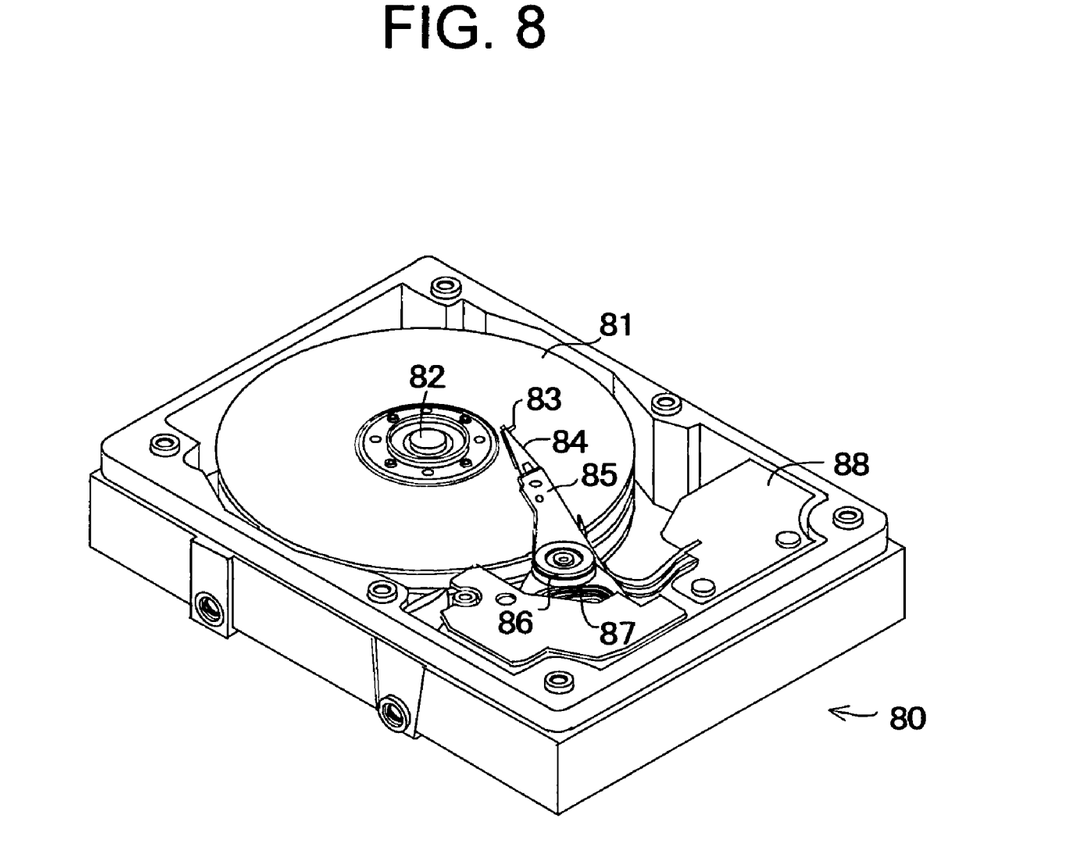
FIG. 8 is a schematically shown oblique view of a magnetic recording apparatus according to an embodiment of the present invention showing the construction by partially removing the covers.

FIG. 8 is a schematically shown oblique view of a magnetic recording apparatus according to an embodiment of the present invention showing the construction by partially removing covers.

In FIG. 8, the magnetic disk 81 according to the present invention is attached to the spindle 82, and is driven at a constant rotating speed by a spindle motor not shown in the Figure. The slider 83 carrying a recording head for recording information and a MR head reproducing the recorded information for gaining access to the surface of the magnetic disk 81 is attached at the top of a suspension 84 constructed by a thin plate shaped flat spring. The suspension 84 is connected to one side of an arm 85 having a bobbin holding a drive coil not shown in the Figure.

At the other side of the arm 85, a voice coil motor 86, a kind of linear motor, is disposed. The voice coil motor 86 is constructed by a magnetic circuit composed of a drive coil rolled up to a bobbin of arm 85, permanent magnet and opposing yokes.

The arm 85 is supported by a ball bearing not shown in the Figure and is driven to swing circularly by the voice coil motor 86. The position of the slider 83 on the magnetic disk 81 is controlled by the voice coil motor 86. In the FIG. 8, a cover 88 is shown partially.

Hereinafter, examples of the present invention will be described to explain the present invention further in detail.

EXAMPLE 1

Nonmagnetic 2.5 inches glass substrates were put into a vacuum chamber of an ANELVA Co. c-3010 type sputtering apparatus.

The vacuum chambers of the sputtering apparatus were evacuated to $1 \times 10^{-6}$ Pa or less. Then the substrates were heated using an infrared heater up to about 300° C. Keeping the substrate temperature to about 300° C., about 200 nm CoZrNb film was deposited as a soft magnetic under-layer, and then an about 30 nm Cu film was deposited. The substrate temperature was then elevated to about 500° C., and nitrogen ions were irradiated to the Cu film surface in 0.1 Pa nitrogen gas atmosphere using ion gun at 200 eV. After the nitrogen ion irradiation, a 5 nm $Fe_{50}Pt_{50}$ film was deposited.

And then a 5 nm carbon film was deposited. For depositing CoZrNb film, Cu film, $Fe_{50}Pt_{50}$ film and C film, the Ar gas pressure was 0.7 Pa, 0,7 Pa, 5 Pa and 0.7 Pa, respectively, and target material was CoZrNb, Cu, $Fe_{50}Pt_{50}$, and C, respectively. The sputtering was performed using DC sputtering.

Power inputted to the targets was fixed to 1,000 W for CoZrNb, $Fe_{50}Pt_{50}$ and C deposition, and varied from in a range from 100 to 1,000 W for Cu deposition.

Then magnetic recording media having $Co_{50}Pt_{50}$, $Fe_{50}Pd_{50}$, and $Co_{70}Cr_{10}Pt_{10}$, instead of $Fe_{50}Pt_{50}$ were fabricated using almost the same procedure described above. The quantity of nitrogen deposition to the Cu film surface was controlled choosing the ion irradiation time. The crystalline grain diameter of the Cu films was varied changing input power to the targets.

After finishing the deposition, each protective-layer was coated with about 1.3 nm thick lubricant of perfluoropolyether (PFPE) by a dipping method. Then, various magnetic recording medium samples were obtained.

As a comparable example, conventional perpendicular magnetic recording media were fabricated by the following procedure. Nonmagnetic 2.5 inches glass substrates were put into the vacuum chambers of the sputtering apparatus and the vacuum chambers were evacuated to $1 \times 10^{-6}$ Pa or less. After heating the substrate using an infrared heater up to about 300° C., 200 nm CoZrNb film as a soft magnetic under-layer, 10 nm Ta film as a seed-layer, 20 nm Ru film as a under-layer, 15 nm $Co_{65}$—$Cr_{20}$—$Pt_{14}$—$Ta_1$-layer as a magnetic recording-layer, and a 5 nm protective-layer was deposited to each substrate, and then the lubricant was coated using the procedure similar to the case for example described above. For depositing CoZrNb film, Ta film, Ru film and CoCrPtTa film, the Ar gas pressure was 0.7 Pa, 0,7 Pa, 0,7 Pa, 5 Pa and 0.7 Pa, respectively, and target material was CoZrNb, Ta, Ru and $Co_{65}Cr_{20}Pt_{14}Ta_1$, respectively. The sputtering was performed using DC sputtering. Power inputted to the targets was fixed to 1,000 W.

The microstructure, the crystalline grain diameters and the grain size distribution of each fabricated sample were evaluated by a transmission electron microscope (TEM) with accelerating voltage of 400 kV. The quantity of nitrogen atoms deposited on the each Cu film was obtained and confirmed by NRA using H+ method similar to the method description found in a report appeared at Surface Science Vol.490 pp.336-350, and SIMS method using Cs+.

Recording and reproducing characteristics (read write characteristics, R/W characteristics) of each magnetic recording medium was evaluated by using a spin stand. The magnetic head applied was a combination of a 0.3 μm track width single pole head and a 0.2 μm track width MR head.

The same measuring condition at a constant magnetic head position of 20 mm from the center and of 4,200 rpm the magnetic disk rotating speed was applied.

Signal to noise ratio for derivative waveforms as an output of a derivative circuit ($SNR_m$) was measured and characterized as the SNR of each magnetic recording medium. The measured signal S was output for linear recording density of 119 kfci, and the measured noise was root mean square value at 716 kfci. In addition, the half width of the derivative waveforms ($dPW_{50}$) was evaluated to obtain as an index for the resolution of the recording.

Table 1 shows the average crystalline grain diameter $d_{Mag}$ and the standard deviation σ of the magnetic-layer of each magnetic recording medium.

TABLE 1

| | Magnetic Recording Layer | Average diameter $d_{Mag}$ (nm) | Standard deviation σ(nm) |
|---|---|---|---|
| Example 1-1 | FePt | 4.5 | 1.0 |
| Example 1-2 | CoCrPt | 4.3 | 1.0 |
| Example 1-3 | CoPt | 4.8 | 1.1 |
| Example 1-4 | FePd | 4.8 | 1.3 |
| Comparative Example 1 | (conventional medium) | 7.1 | 2.5 |

Comparing each magnetic recording medium of the Example 1 with the magnetic recording medium of the Comparative example 1 for the average crystalline grain diameter $d_{Mag}$ and the standard deviation σ of the magnetic-layer in Table 1, each magnetic recording medium of the Example 1 shows significantly smaller average crystalline grain diameter with smaller standard deviation.

Figure 9:
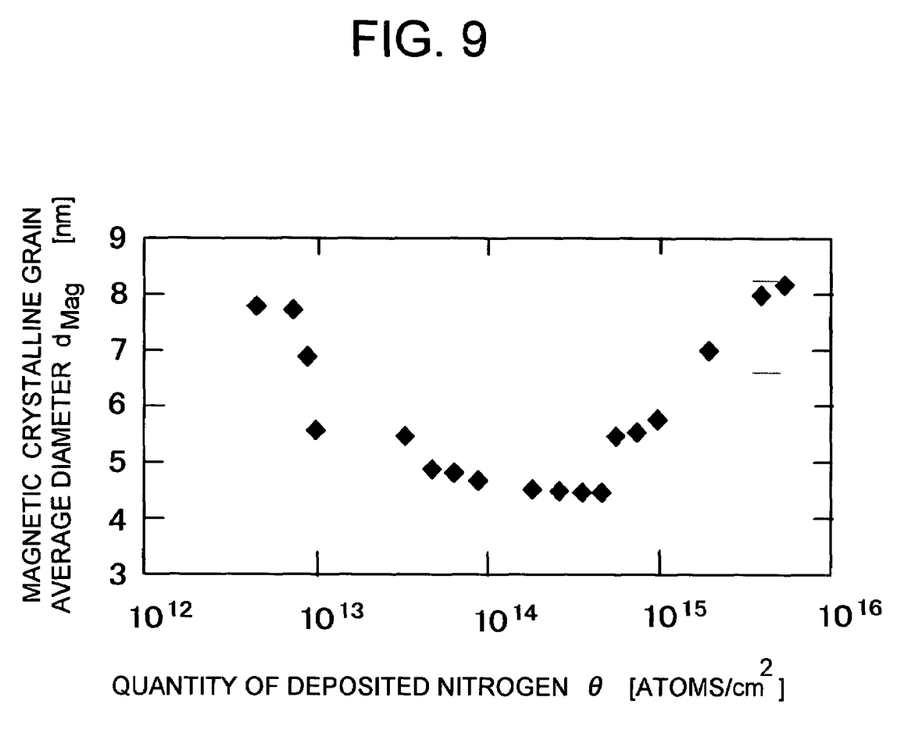
FIG. 9 is a graph showing the relation between the number of deposited nitrogen atoms per unit area and the average grain diameter of the magnetic recording-layer of Example 1.

FIG. 9 shows a relationship between the quantity of deposited nitrogen θ and the average magnetic crystalline grain diameter $d_{Mag}$ for $Fe_{50}Pt_{50}$ magnetic-layer obtained by a nuclear reaction analysis NRA. From this Figure, it can be found that the crystalline grains are significantly small and are desirable when the θ value is in a range from $1 \times 10^{13}$ atom/cm$^2$ to $1 \times 10^{15}$ atom/cm$^2$. Similar results were obtained for the cases of $Co_{50}Pt_{50}$, $Fe_{50}Pd_{50}$ and $Co_{70}Cr_{10}Pt_{20}$ magnetic-layer. For each magnetic recording medium, the nitrogen atoms deposited on the grain diameter control underlayer comprising Cu crystalline grains was detected by a chemical element distribution measurement using SIMS toward the depth direction.

Figure 10:
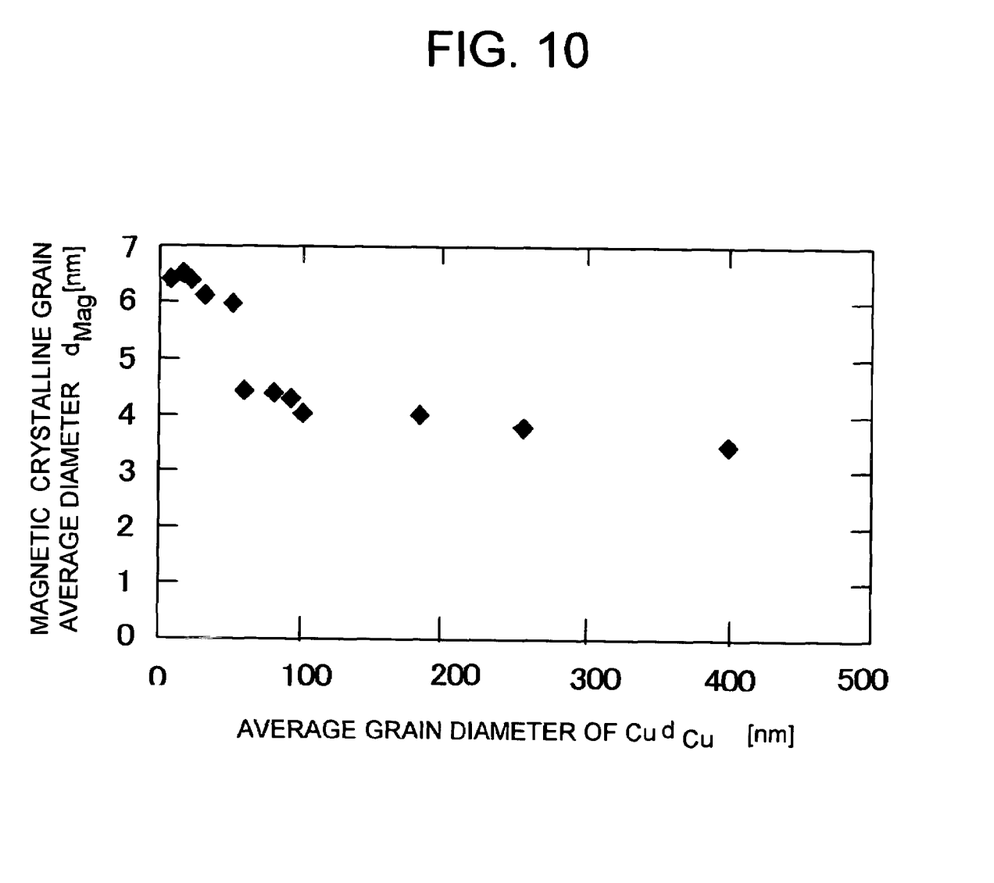
FIG. 10 is a graph showing the relation between the average diameter of the Cu grains and the average diameter of the magnetic crystalline grains in the magnetic recording-layer.

FIG. 10 shows a relationship between the average diameter of Cu crystalline grains at Cu-layer and the average diameter of magnetic crystalline grains for $Fe_{50}Pd_{50}$ magnetic-layers with $2 \times 10^{14}$ atom/cm$^2$ deposited nitrogen. From FIG. 10, the average grain diameter of the magnetic-layer became significantly small when the average grain diameter of Cu-layer is 50 nm or larger.

Figure 11:
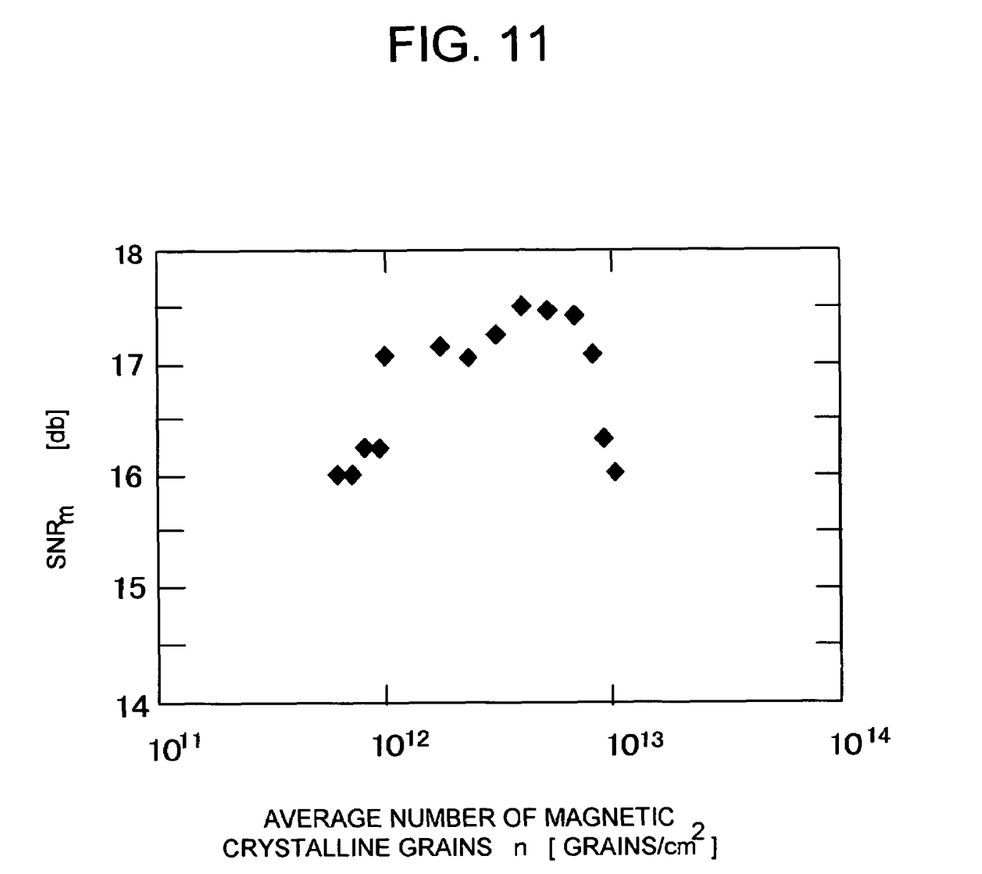
FIG. 11 is a graph showing the relation between the number of the magnetic crystalline grains per unit area of the magnetic recording-layer and signal to noise ratio of differential wave form ($SNR_m$) of the magnetic recording-layer of Example 1.

FIG. 11 shows a relationship between $SNR_m$ of each magnetic recording medium and number of magnetic crystalline grains per unit area (areal density of grains) n obtained by TEM observation for average diameter of Cu $d_{Cu}$ of 100 nm.

As seen from FIG. 11, the $SNR_m$ increases and desirable when the value of n is in a range from $1 \times 10^{12}$ grains/cm$^2$ to $8 \times 10^{12}$ grains/cm$^2$. When the value of n was in a range from $1 \times 10^{12}$ grains/cm$^2$ to $8 \times 10^{12}$ grains/cm$^2$, plural number of magnetic grains of a magnetic recording medium is placed on a Cu crystalline grains on average.

Ordered arrangement of magnetic crystalline grains was investigated for each in-plane TEM Figures using an image processing and analyzing software "Image-Pro Plus" (Media Cybernetics Co., USA). To each TEM Figure, a modification was given to obtain a pattern expressed by binary variables by increasing the contrast between regions of the magnetic crystal grains and other regions. The Figure expressed by binary Figures was then transformed by FFT. As the result, no ordered arrangement of magnetic grains in the magnotic-layer was recognized for the conventional medium. On the other hand, for each magnetic recording medium having n values in a range from $1 \times 10^{12}$ grains/cm$^2$ to $8 \times 0^{12}$ grains/cm$^2$, the ordered arrangement of the magnetic crystalline grains to tetragonal lattice structure was recognized.

EXAMPLE 2

Nonmagnetic 2.5 inches glass substrates were put into the vacuum chambers and the vacuum chambers were evacuated to $1 \times 10^{31\ 6}$ Pa or less. Then CoZrNb soft magnetic underlayer, Cu deposition and nitrogen deposition process were performed using the method described in Example 1. Then a 5 nm $Fe_{50}Pt_{50}$—$SiO_2$ magnetic-layer was formed using ($Fe_{50}$—$Pt_{50}$)-10 mol % $SiO_2$ composite target. Furthermore, magnetic disks having $Co_{50}Pt_{50}$, $Fe_{50}Pd_{50}$ and $Co_{70}Cr_{10}Pt_{20}$ respectively replacing $Fe_{50}Pt_{50}$-layer of the disks in example 1 were fabricated using respective targets. Similarly, magnetic disks having TiO, $Al_2O_3$, TiC and TaC respectively, were fabricated replacing $SiO_2$-layer in Example 1. Then carbon protective-layer was deposited and lubricant-layer was coated for each fabricated magnetic recording medium.

Table 2 shows SNRm values and $dPW_{50}$ values for each magnetic recording medium. Magnetic recording media having magnetic recording-layer composite with the chemical compounds show increased $SNR_m$ and are desirable. For every film composite with chemical compounds, granular structure and essentially tetragonal arrangement of the magnetic crystalline grains of the magnetic-layer are recognized by TEM observation.

TABLE 2

| | Magnetic recording layer | Signal to noise ratio SNRm (dB) | half width $dPW_{50}$ (nm) |
|---|---|---|---|
| Example 2-1 | FePt | 17.1 | 98 |
| Example 2-2 | CoCrPt | 17.3 | 93 |
| Example 2-3 | CoPt | 17.0 | 99 |
| Example 2-4 | FePd | 16.8 | 97 |
| Example 2-5 | FePt—$SiO_2$ | 18.3 | 90 |
| Example 2-6 | CoCrPt—$SiO_2$ | 18.6 | 89 |
| Example 2-7 | CoPt—$SiO_2$ | 18.0 | 90 |
| Example 2-8 | FePd—$SiO_2$ | 18.0 | 89 |
| Example 2-9 | FePt—MgO | 18.2 | 91 |
| Example 2-10 | CoCrPt—MgO | 18.2 | 90 |
| Example 2-11 | CoPt—MgO | 18.0 | 87 |
| Example 2-12 | FePd—MgO | 17.8 | 86 |
| Example 2-13 | FePt—$Al_2O_3$ | 17.9 | 89 |
| Example 2-14 | CoCrPt—$Al_2O_3$ | 17.9 | 86 |
| Example 2-15 | CoPt—Al2O3 | 17.7 | 87 |
| Example 2-16 | FePd—Al2O3 | 17.7 | 89 |
| Example 2-17 | FePt—TiO | 18.1 | 87 |

TABLE 2-continued

|  | Magnetic recording layer | Signal to noise ratio SNRm (dB) | half width dPW$_{50}$ (nm) |
|---|---|---|---|
| Example 2-18 | CoCrPt—TiO | 18.2 | 90 |
| Example 2-19 | CoPt—TiO | 17.9 | 87 |
| Example 2-20 | FePd—TiO | 17.9 | 88 |
| Example 2-21 | FePt—TiC | 17.8 | 90 |
| Example 2-22 | CoCrPt—TiC | 17.8 | 92 |
| Example 2-23 | CoPt—TiC | 17.7 | 90 |
| Example 2-24 | FePd—TiC | 17.8 | 88 |
| Example 2-25 | FePt—TaC | 17.9 | 87 |
| Example 2-26 | CoCrPt—TaC | 17.8 | 90 |
| Example 2-27 | CoPt—TaC | 17.8 | 87 |
| Example 2-28 | FePd—TaC | 17.8 | 88 |
| Comparative Example 2 | (conventional medium) | 15.4 | 109 |

EXAMPLE 3

2.5 inch hard disk shaped nonmagnetic glass substrates were prepared and film depositions were performed using the process of Example 1 up to nitrogen deposition treatment. Then 10 nm Pt—SiO$_2$ layer was deposited using Pt-10 mol % SiO$_2$ composite target. On the Pt—SiO$_2$-layer, various magnetic recording-layers were deposited and then various magnetic recording media were obtained after depositing carbon protective-layer and coating lubricant-layer using the procedure described in Example 2. In addition, magnetic recording media having Pd, Ir, Ag, Cu, Ru and Rh under-layer, respectively, instead of the Pt under-layer, and magnetic recording media having TiO, Al$_2$O$_3$, MgO, TiC and TaC under-layer, respectively, instead of the SiO$_2$ under-layer were obtained using respective composite targets.

Table 3 shows SNR$_m$ and dPW$_{50}$ for each magnetic recording medium having CoCrPt—SiO$_2$ magnetic recording-layer and various under-layers.

TABLE 3

|  | Under layer | signal to noise ratio SNRm (dB) | half width dPW$_{50}$ (nm) |
|---|---|---|---|
| Example 3-1 | Pt—SiO$_2$ | 19.6 | 80 |
| Example 3-2 | Pd—SiO$_2$ | 19.6 | 81 |
| Example 3-3 | Ir—SiO$_2$ | 19.3 | 79 |
| Example 3-4 | Ag—SiO$_2$ | 19.0 | 78 |
| Example 3-5 | Cu—SiO$_2$ | 18.9 | 79 |
| Example 3-6 | Ru—SiO$_2$ | 19.8 | 77 |
| Example 3-7 | Rh—SiO$_2$ | 19.7 | 77 |
| Example 3-8 | Pt—MgO | 19.4 | 81 |
| Example 3-9 | Pd—MgO | 19.4 | 80 |
| Example 3-10 | Ir—MgO | 19.0 | 77 |
| Example 3-11 | Ag—MgO | 19.0 | 81 |
| Example 3-12 | Cu—MgO | 19.3 | 81 |
| Example 3-13 | Ru—MgO | 19.5 | 79 |
| Example 3-14 | Rh—MgO | 19.5 | 77 |
| Example 3-15 | Pt—Al$_2$O$_3$ | 19.4 | 77 |
| Example 3-16 | Pd—Al$_2$O$_3$ | 19.6 | 82 |
| Example 3-17 | Ir—Al$_2$O$_3$ | 19.2 | 80 |
| Example 3-18 | Ag—Al$_2$O$_3$ | 19.4 | 79 |
| Example 3-19 | Cu—Al$_2$O$_3$ | 19.5 | 82 |
| Example 3-20 | Ru—Al$_2$O$_3$ | 19.7 | 75 |
| Example 3-21 | Rh—Al$_2$O$_3$ | 19.4 | 78 |
| Example 3-22 | Pt—TiO | 19.6 | 73 |
| Example 3-23 | Pd—TiO | 19.9 | 80 |
| Example 3-24 | Ir—TiO | 19.3 | 78 |
| Example 3-25 | Ag—TiO | 19.5 | 74 |
| Example 3-26 | Cu—TiO | 19.0 | 79 |
| Example 3-27 | Ru—TiO | 20.0 | 76 |
| Example 3-28 | Rh—TiO | 19.8 | 78 |
| Example 3-29 | Pt—TiC | 19.3 | 79 |
| Example 3-30 | Pd—TiC | 19.3 | 75 |
| Example 3-31 | Ir—TiC | 19.5 | 77 |
| Example 3-32 | Ag—TiC | 19.0 | 78 |
| Example 3-33 | Cu—TiC | 18.9 | 74 |
| Example 3-34 | Ru—TiC | 18.9 | 74 |
| Example 3-35 | Rh—TiC | 18.9 | 80 |
| Example 3-36 | Pt—TaC | 19.0 | 79 |
| Example 3-37 | Pd—TaC | 19.0 | 77 |
| Example 3-38 | Ir—TaC | 19.3 | 73 |
| Example 3-39 | Ag—TaC | 19.2 | 74 |
| Example 3-40 | Cu—TaC | 19.2 | 78 |
| Example 3-41 | Ru—TaC | 19.1 | 75 |
| Example 3-42 | Rh—TaC | 19.1 | 79 |

Increase of SNR$_m$ was found for magnetic recording medium disposing an under-layer composite with chemical compound under the CoCrPt—SiO$_2$ magnetic recording-layer. Similar results were found for magnetic recording medium having other magnetic recording-layer. Each magnetic recording-layer and under-layer show granular structure, and the magnetic crystalline grains show essentially tetragonal arrangement.

EXAMPLE 4

2.5 inch hard disk shaped nonmagnetic glass substrates were prepared and traced the procedure of Example 3 except that one orientation control layer was disposed between soft magnetic under-layer and grain diameter control layer. Then various magnetic recording media were obtained. As the orientation control layer, 5 nm NiAl-layer was deposited in 0.7 Pa Ar atmosphere preparing and using NiAl targets. In addition, magnetic recording media having orientation control layer of MgO, NiO, MnAl, Ge, Si, and TiN, respectively, are fabricated.

Table 4 shows recording and reproducing characteristics of each magnetic recording medium having CoCrPt—SiO$_2$ magnetic recording-layer and Pt——SiO$_2$ under-layer.

TABLE 4

|  | Orientation Controlling Under layer | signal to noise ratio SNRm (dB) | Half width DPW$_{50}$ (nm) |
|---|---|---|---|
| Example 4-1 | none | 19.8 | 77 |
| Example 4-2 | NiAl | 20.5 | 76 |
| Example 4-3 | MgO | 20.3 | 75 |
| Example 4-4 | NiO | 20.0 | 76 |
| Example 4-5 | MnAl | 20.3 | 77 |
| Example 4-6 | Si | 20.0 | 73 |
| Example 4-7 | Ge | 20.1 | 76 |
| Example 4-8 | TiN | 20.4 | 76 |

As shown in Table 4, SNR$_m$ increases further by disposing the orientation control layer. Similar results were found for magnetic recording medium having other combination of under-layer and magnetic recording-layer.

Although the prevent invention has been shown and described with respect to best mode embodiments thereof, it should be understood by those skilled in art that the foregoing and various other changes in the form and detail without departing from the spirit and scope of the present invention.

What is claimed is:

1. A magnetic recording medium, comprising:
substrate;
an under-layer formed on the substrate, the under-layer including:
a grain diameter control layer comprising Cu crystalline grains; and
a deposited layer of nitrogen atoms formed on the grain diameter control under-layer surface, the deposited layer of nitrogen atoms comprises nitrogen atoms in a range from $1\times10^{13}$ atoms/cm$^2$ to $1\times10^{15}$ atoms/cm$^2$ on the average of areal density;
a magnetic recording-layer on the under-layer; and
a protective-layer formed on the magnetic recording layer.

2. A magnetic recording medium, comprising:
a substrate;
an under-layer formed on the substrate, the under-layer including:
a grain diameter control layer comprising Cu crystalline grains orienting each (100) plane parallel to the substrate surface; and
a deposited layer of nitrogen atoms formed on the grain diameter control under-layer surface;
a magnetic recording-layer on the under-layer; and
a protective-layer formed on the magnetic recording-layer.

3. A magnetic recording medium, comprising:
a substrate;
an under-layer formed on the substrate, the under-layer including:
a grain diameter control layer comprising Cu crystalline grains; and
a deposited layer of nitrogen atoms formed on the grain diameter control under-layer surface;
a magnetic recording-layer on the under-layer, the magnetic recording-layer comprises magnetic grains at average areal density in a range from $1\times10^{12}$ grains/cm$^2$ to $8\times10^{12}$ grains/cm$^2$, and a Cu crystalline grain of the diameter control under-layer holds plural magnetic crystalline grains on average; and
a protective-layer formed on the magnetic recording layer.

4. A magnetic recording medium, comprising:
a substrate;
an under-layer formed on the substrate, the under-layer including:
a grain diameter control layer comprising Cu crystalline grains; and
a deposited layer of nitrogen atoms formed on the grain diameter control under-layer surface;
a magnetic recording-layer on the under-layer, the magnetic recording-layer comprising magnetic crystalline grains arranged in a form of tetragonal lattice structure; and
a protective-layer formed on the magnetic recording-layer.

5. A magnetic recording and reproducing apparatus, comprising:
a magnetic recording medium comprising:
a substrate;
an under-layer formed on the substrate, the under-layer including:
a grain diameter control layer comprising Cu crystalline grains; and
a deposited layer of nitrogen atoms formed on the grain diameter control under-layer surface, the deposited layer of nitrogen atoms comprising nitrogen atoms in a range from $1\times10_{13}$ atoms/cm$^2$ to $1\times10^{15}$ atoms/cm$^2$ on the average of areal density;
a magnetic recording-layer on the under-layer; and
a protective-layer formed on the magnetic recording-layer;
a recording medium driving mechanism, driving the magnetic recording medium;
a recording and reproducing head mechanism, recording information to the magnetic recording medium and reproducing from the magnetic recording medium;
a head driving mechanism, driving the recording and reproducing head; and
a recording and reproducing signal processing system, processing recording signals and reproducing signals.

6. A magnetic recording and reproducing apparatus as set forth in claim 5,
wherein the recording and reproducing head mechanism comprises a single pole head.

7. A magnetic recording and reproducing apparatus, comprising:
a magnetic recording medium comprising:
a substrate,
an under-layer formed on the substrate, the under-layer including:
a grain diameter control layer comprising Cu crystalline grains orienting each (100) plane parallel to the substrate surface; and
a deposited layer of nitrogen atoms formed on the grain diameter control under-layer surface;
a magnetic recording-layer on the under-layer; and
a protective-layer formed on the magnetic recording layer;
a recording medium driving mechanism, driving the magnetic recording medium;
a recording and reproducing head mechanism, recording information to the magnetic recording medium and reproducing from the magnetic recording medium;
a head driving mechanism, driving the recording and reproducing head; and
a recording and reproducing signal processing system, processing recording signals and reproducing signals.

8. A magnetic recording and reproducing apparatus as set forth in claim 7,
wherein the recording and reproducing head mechanism comprises a single pole head.

9. A magnetic recording and reproducing apparatus, comprising:
a magnetic recording medium comprising:
a substrate;
an under-layer formed on the substrate, the under-layer including:
a grain diameter control layer comprising Cu crystalline grains; and
a deposited layer of nitrogen atoms formed on the grain diameter control under-layer surface;
a magnetic recording-layer on the under-layer, the magnetic recording-layer comprising magnetic grains at average areal density in a range from $1\times10^{12}$ grains/cm$^2$ to $8\times10^{12}$ grains/cm$^2$, and a Cu crystalline grain of the diameter control under-layer holds plural magnetic crystalline grains on average; and
a protective-layer formed on the magnetic recording-layer;
a recording medium driving mechanism, driving the magnetic recording medium;
a recording and reproducing head mechanism, recording information to the magnetic recording medium and reproducing from the magnetic recording medium;

a head driving mechanism, driving the recording and reproducing head; and a recording and reproducing signal processing system, processing recording signals and reproducing signals.

10. A magnetic recording and reproducing apparatus as set forth in claim 9, wherein the recording and reproducing head mechanism comprises a single pole head.

11. A magnetic recording and reproducing apparatus, comprising:

magnetic recording and reproducing apparatus, comprising:

a magnetic recording medium comprising;

a substrate;

an under-layer formed on the substrate, the under-layer including:

a grain diameter control layer comprising Cu crystalline grains; and a deposited layer of nitrogen atoms formed on the grain diameter control under-layer surface;

a magnetic recording-layer on the under-layer, the magnetic recording-layer comprising magnetic crystalline grains arranged in a form of tetragonal lattice structure;

a protective-layer formed on the magnetic recording-layer;

a recording medium driving mechanism, driving the magnetic recording medium;

a recording and reproducing head mechanism, recording information to the magnetic recording medium and reproducing from the magnetic recording medium;

a head driving mechanism, driving the recording and reproducing head; and a recording and reproducing signal processing system, processing recording signals and reproducing signals.

12. A magnetic recording and reproducing apparatus as set forth in claim 11, wherein the recording and reproducing head mechanism comprises a single pole head.

* * * * *